(No Model.) 3 Sheets—Sheet 1.
R. T. WILLIAMS.
ANIMAL TRAP.
No. 487,593. Patented Dec. 6, 1892.
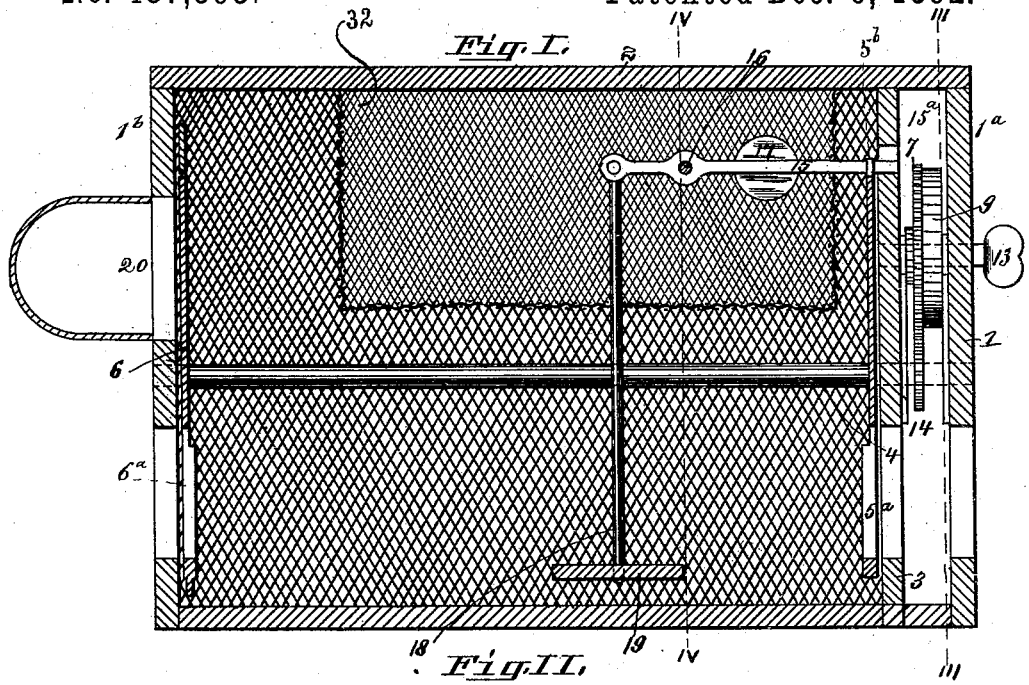
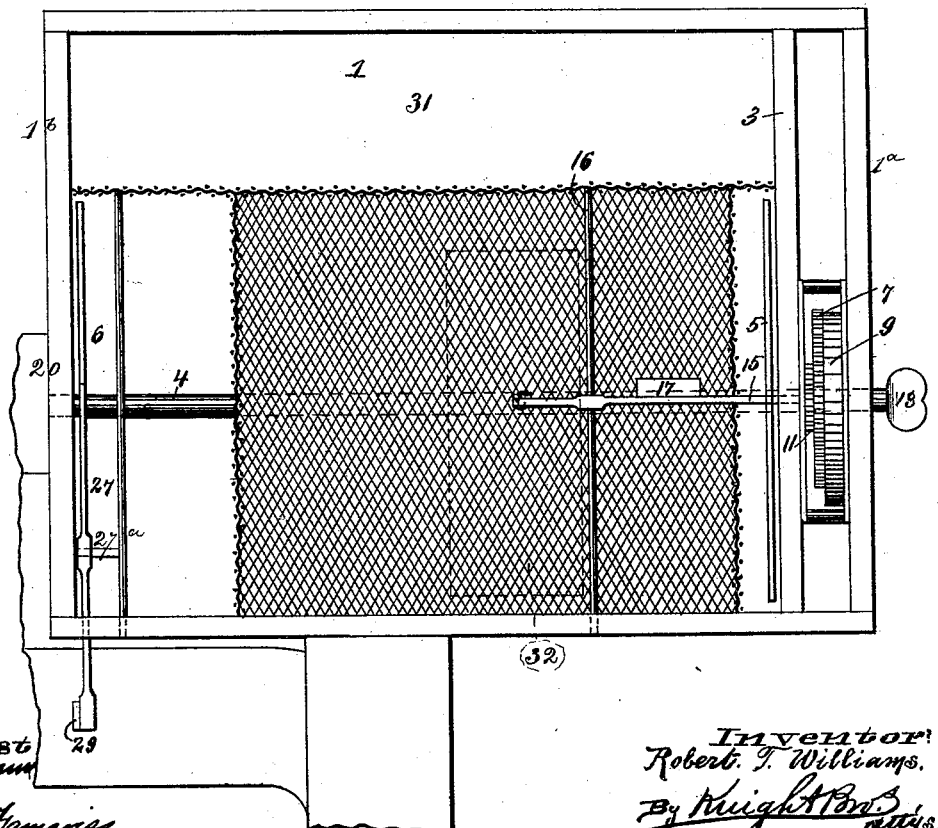
Inventor:
Robert T. Williams.
By Knight Bros
Attys.

(No Model.) 3 Sheets—Sheet 2.
R. T. WILLIAMS.
ANIMAL TRAP.
No. 487,593. Patented Dec. 6, 1892.
Fig. III.
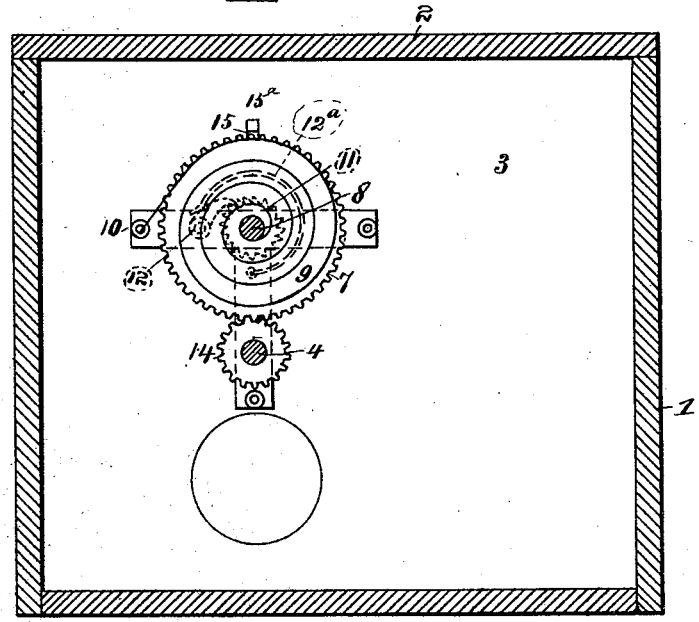
Fig. IV.
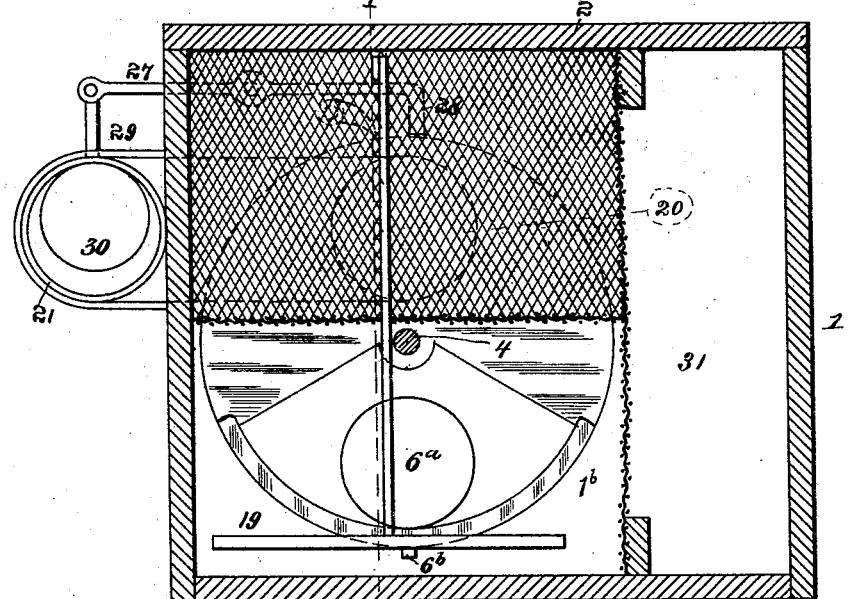
Fig. V.
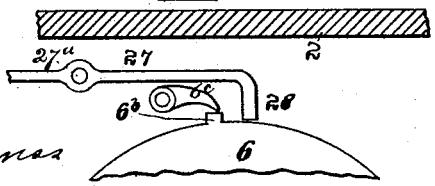
Attest:
G. E. Cruse
Walter Havanes
Inventor:
Robert T. Williams.
By Knight Bros.
attys.

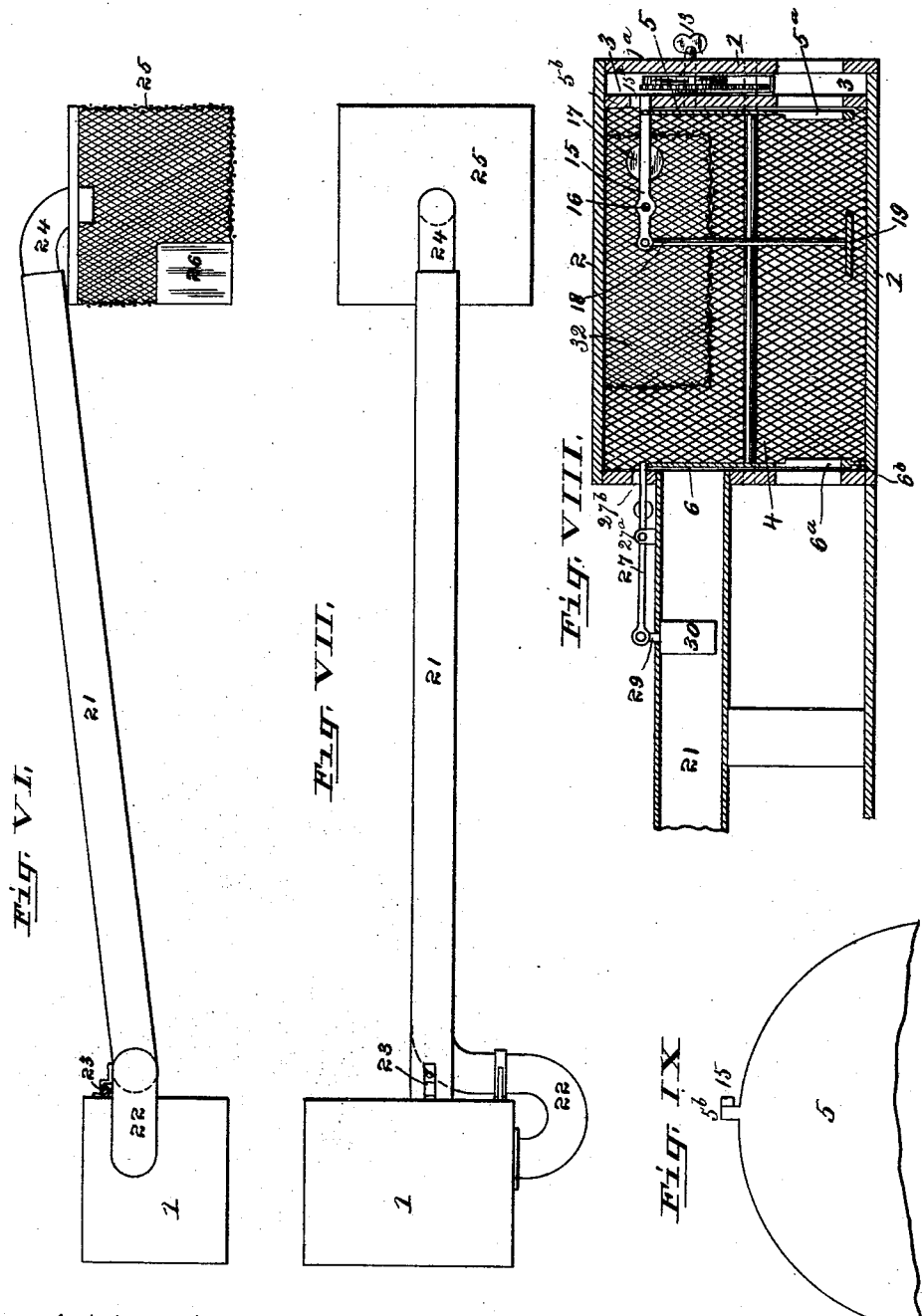

UNITED STATES PATENT OFFICE.

ROBERT T. WILLIAMS, OF ST. LOUIS, MISSOURI.

ANIMAL-TRAP.

SPECIFICATION forming part of Letters Patent No. 487,593, dated December 6, 1892.

Application filed June 21, 1892. Serial No. 437,510. (No model.)

*To all whom it may concern:*

Be it known that I, ROBERT T. WILLIAMS, of the city of St. Louis, in the State of Missouri, have invented a certain new and useful Improvement in Animal-Traps, of which the following is a full, clear, and exact description, reference being had to the accompanying drawings, forming part of this specification.

My invention relates to a trap for catching small animals—such as rats, minks, &c.—in which the parts are operated to trip and reset the trap by the animal in passing through the trap; and my invention consists in features of novelty hereinafter fully described, and pointed out in the claims.

Figure I is a longitudinal vertical section through the trap, taken on line I I, Fig. IV. Fig. II is a top or plan view with the top removed. Fig. III is a vertical transverse section taken on line III III, Fig. I. Fig. IV is a vertical transverse section taken on line IV IV, Fig. I. Fig. V is a detail view illustrating the trip mechanism of the door at the rear end of the trap. Fig. VI is a side elevation showing the trap, the animal-receiving box, and the tube that connects them together. Fig. VII is a top or plan view of the trap, animal-receiving box, and their connecting-tube. Fig. VIII is a vertical longitudinal section illustrating a modification. Fig. IX is a detail view showing the trip mechanism of the door at the front end of the trap.

Referring to the drawings, 1 represents the box, and 2 the top of the box. 3 is a partition-board located within the box at a short distance from the front of the box to allow space between it and the front for the spring mechanism that operates the doors of the trap. In the front and rear ends and in the partition-board 3 are openings through which the animal passes in entering the trap proper.

4 represents a shaft, whose ends are loosely mounted in the ends of the box and the partition-board 3, and to which are secured the circular doors 5 and 6, that control the openings in the box. The doors 5 and 6 are provided with openings $5^a$ and $6^a$, that register with the openings in the ends of the box and partition-board when the trap is open, as seen in Fig I.

7 represents a spur-wheel mounted on a shaft 8, that has loose bearing in the front end board $1^a$ and the partition-board 3.

9 is a spring secured at one end to the shaft 8 and at the other end at 10 to the end board $1^a$. On the shaft 8 is a ratchet-wheel 11, with which a dog 12 engages to prevent the unwinding of the spring 9 without the rotation of the cog-wheels.

13 is a thumb-piece on the shaft 8, by which it may be turned in winding up the spring 9. The dog is held to the ratchet-wheel by a spring $12^a$. (See dotted lines in Fig. III.)

14 is a pinion mounted on the shaft 4, that engages with the teeth of the wheel 7.

15 is a lever mounted on a rod 16, and 17 is a counterbalance-weight on the lever. The lever 15 has pivoted to its inner end a depending rod 18, to whose lower end is secured a treadle 19. The free end of the lever 15 extends over a detent-lug extending from the periphery of the door 5, said lug coming in contact with the lever 15 and arresting the movement of the doors when they arrive at the position seen in Fig. I. The end of the lever works in a slot $15^a$ in the board 3, the sides of said slot giving transverse support to the lever. When the animal, after entering the trap through either of the doors 5 or 6 provided for its entrance, steps upon the treadle 19, the treadle is depressed and the free or outer end of the lever 15 is lifted out of contact with the lug $5^b$ on the door 5 and the door, through means of the spring mechanism that engages with the pinion 14 on the shaft 4, is turned. The animal steps from the treadle and the counterbalance 17 causes the end of the lever 15 to fall into position for engagement with the lug $5^b$, the bottom of the slot $15^a$ arresting the descent of the lever. When the doors have turned one-half way around, a lug $6^b$, projecting from the periphery of the door 6, comes in contact with the free end of a lever 27 at the rear end of the trap, and at this time the lower openings (through one of which the animal has entered) will be closed by the solid portions of the doors, and the openings $5^a$ and $6^a$ in the doors will be at the top of the trap. It will be understood that the detent-lugs $5^b$ and $6^b$ are at opposite sides of the doors 5 and 6, respectively, so that when one of the lugs is up the other is down.

$6^c$ is a gravitating dog, which prevents the backward rotation of the door 6 by engagement with the lug $6^b$.

20 represents an opening in the upper portion of the rear end $1^b$ of the box, with which the opening $6^a$ in the door 6 registers when the trap has been sprung, and with this opening 20 is connected a tube 21. This tube I prefer to make of the form shown in Figs. VI and VII, in which it is made with a curved elbow 22, firmly connecting it to the box 1 and which is inserted in the tube. The tube is supported by a hook engaging in an eye, as seen at 23, and the other end of the tube slips onto an elbow 24, secured in a box 25, to which the animal passes after leaving the trap.

26 is a door in the box 25, by which the animals may be removed from the box.

The detent-lever 27 is fulcrumed at $27^a$ to the end $1^b$ of the box, and its downturned end 28 is adapted to arrest the movement of the doors by the impact of the lug $6^b$ on the door 6. The other end of this lever 27 extends to the outside of the box and has pivoted thereto a depending rod 29, to the lower end of which rod is secured a circular treadle 30. This treadle 30 is within the tube 21, as shown most clearly in Fig. IV.

When the animal, after entering the trap, steps upon the treadle 19, (as has been before partially described,) the shaft 4 is caused to revolve, carrying with it the doors 5 and 6, until said doors have made one-half of a revolution. It will be seen that the openings $5^a$ and $6^a$ in the doors will then be at the upper side of the trap, and the lower openings in the box, through one of which the animal has entered, will be closed by the solid portions of the door. The opening $6^a$ in the door 6 will, when the entering-openings in the box are closed, register with the opening 20, that connects with the tube 21. The animal finding the only exit from the trap to be the opening 20 will pass through that opening into the tube 21, and in going through the tube will step upon the treadle 30, thus raising the inner end 28 of the lever 27 out of contact with the lug $6^b$ on the door 6, which will allow the door to move one-half revolution until the lever 15 comes in contact with the lug $5^b$ on the door 5, at which time the trap will be reset. The openings in the doors then being at the lower side of the trap, the animal will find his retreat to the trap impossible and will pass through the tube 21 toward the animal-receiving box 25, and as the tube 24, that connects with the box 25, enters the box at the top (preferably at the center) after the animal has once passed into the box he cannot again reach this opening to escape from the box, and may be removed through the door 26.

31 represents a receptacle intended especially for live bait. 32 is a receptacle to contain other bait. Both of these receptacles are separated by wire partitions or walls from the compartment occupied by the captured animal.

In the modification I have shown in Fig. VIII the tube 21, instead of having a rounded or goose-neck form next the trap, may be connected directly with the trap and be of the straight form shown in Fig. VIII. The detent-lever 27 is in this case horizontal and fulcrumed on top of the tube, as seen at $27^a$. The end of the lever passes through a slot $27^b$ in the wall $1^b$, as seen.

I claim as my invention—

1. In an animal-trap, the combination of the box, openings in the box for the entrance and exit of animals, rotating doors for controlling said openings mounted on a shaft, and spring mechanism for operating said doors, substantially as and for the purpose set forth.

2. In an animal-trap, the combination of the box, openings in the box for the entrance and exit of animals, a shaft loosely mounted in the box, doors secured to the shaft and provided with openings on one side, a pinion on said shaft, a spring, and a toothed wheel for operating said shaft through connection with the pinion, and levers at the ends of the box for regulating the movement of the doors, substantially as and for the purpose set forth.

3. In an animal-trap, the combination of the box, openings in the box for the entrance and exit of animals, doors for controlling said openings operated by a spring, lugs on the doors, levers 15 and 27, that come in contact with said lugs, and treadles 19 and 30 for operating said levers, substantially as and for the purpose set forth.

4. In an animal-trap, the combination of the box, openings for the entrance of animals, an opening for the exit of animals, a tube leading from said exit-opening to a box for receiving the animals, and a treadle in said tube that operates a lever to close the exit-opening, substantially as and for the purpose set forth.

ROBERT T. WILLIAMS.

In presence of—
J. M. MAROT,
SAML. KNIGHT.